United States Patent
Yao et al.

(10) Patent No.: US 7,904,620 B2
(45) Date of Patent: Mar. 8, 2011

(54) DATA TRANSMISSION SYSTEM WITH PROTOCOL CONVERSION

(75) Inventors: Fei Yao, Beijing (CN); Yong Xiao, Beijing (CN); Yiliang Wu, Beijing (CN)

(73) Assignee: Analogix (China) Semiconductor, Inc., Beijing (CN)

( * ) Notice: Subject to any disclaimer, the term of this patent is extended or adjusted under 35 U.S.C. 154(b) by 0 days.

(21) Appl. No.: 12/299,281

(22) PCT Filed: Jun. 26, 2008

(86) PCT No.: PCT/CN2008/001233
§ 371 (c)(1),
(2), (4) Date: Oct. 31, 2008

(87) PCT Pub. No.: WO2009/046617
PCT Pub. Date: Apr. 16, 2009

(65) Prior Publication Data
US 2010/0185792 A1    Jul. 22, 2010

(30) Foreign Application Priority Data
Oct. 12, 2007   (CN) .......................... 2007 1 0175829

(51) Int. Cl.
*G06F 13/12* (2006.01)
*G06F 3/00* (2006.01)
*G06F 13/42* (2006.01)
(52) U.S. Cl. ................. 710/65; 710/11; 710/12; 710/105
(58) Field of Classification Search .................... None
See application file for complete search history.

(56) References Cited

U.S. PATENT DOCUMENTS

| 2006/0288139 | A1 | 12/2006 | Lee et al. |
| 2007/0106959 | A1 | 5/2007 | McGowan |
| 2008/0026914 | A1 * | 1/2008 | Chen et al. .................. 482/4 |
| 2008/0250184 | A1 * | 10/2008 | Sheafor et al. ............. 710/306 |

FOREIGN PATENT DOCUMENTS

| CN | 2519956 A | 11/2002 |
| CN | 2676288 A | 2/2005 |
| CN | 2676288 A | 5/2005 |
| EP | 1727020 A2 | 11/2006 |

* cited by examiner

*Primary Examiner* — Alan Chen
(74) *Attorney, Agent, or Firm* — Vincent K. Gustafson; Intellectual Property/Technology Law

(57) ABSTRACT

The invention disclosed a data transmission system, comprising a first conversion module provided on the host side, used for converting USB data into data in format which may be transmitted by a data transmission module and for converting data in format which may be transmitted by the data transmission module into USB data the data transmission module provided between the host and the monitor, used for data intercommunication between the host and the monitor, and a second conversion module provided on the monitor side, used for converting USB data into data in format which may be transmitted by the data transmission module and for converting data in format which may be transmitted by the data transmission module into USB data. Wherein, the data transmission module is a DisplayPort auxiliary channel (DisplayPort AUX CH). With the invention, the connection of the personal computer host and the monitor may be realized by using only one DisplayPort cable, thereby USB interfaces may be integrated on the monitor. The manner may reduce the complexity and cost of the computer system, and may enhance the user experience.

12 Claims, 4 Drawing Sheets

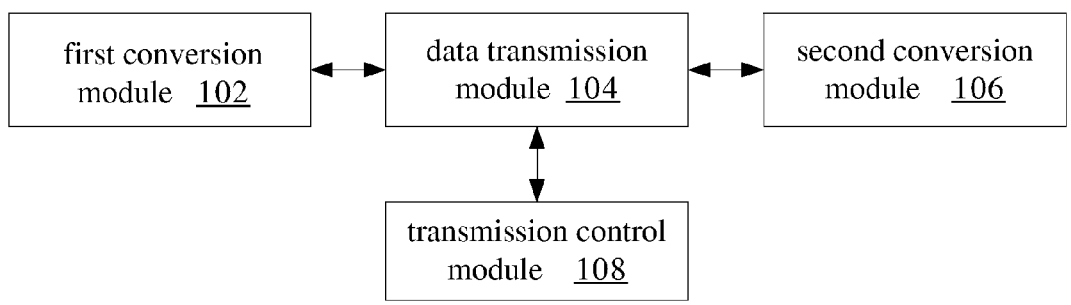
FIG._1

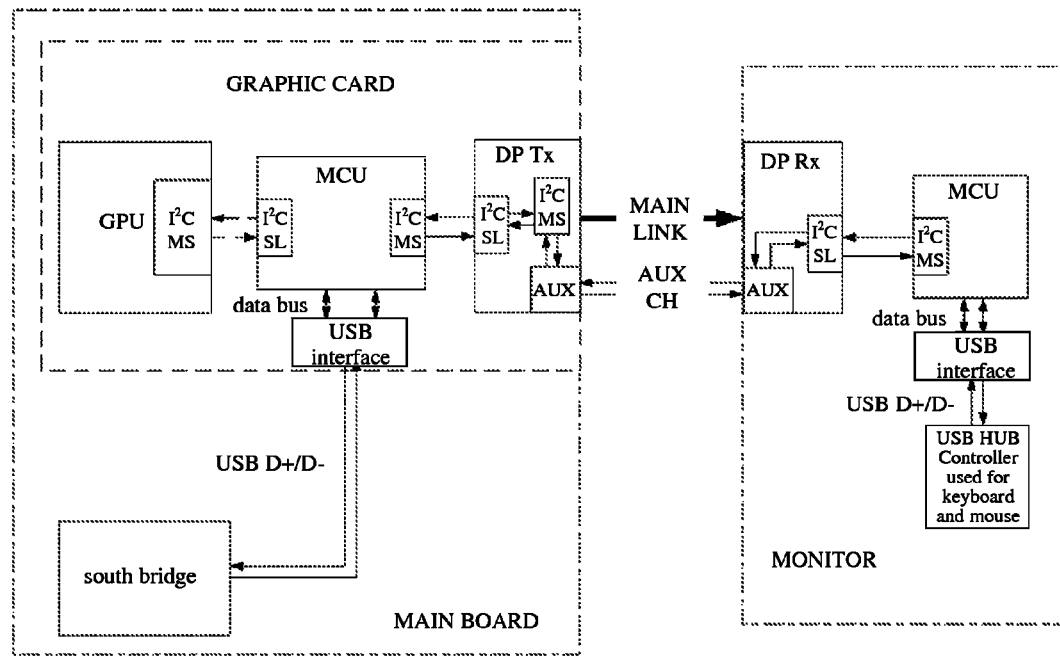
FIG._2

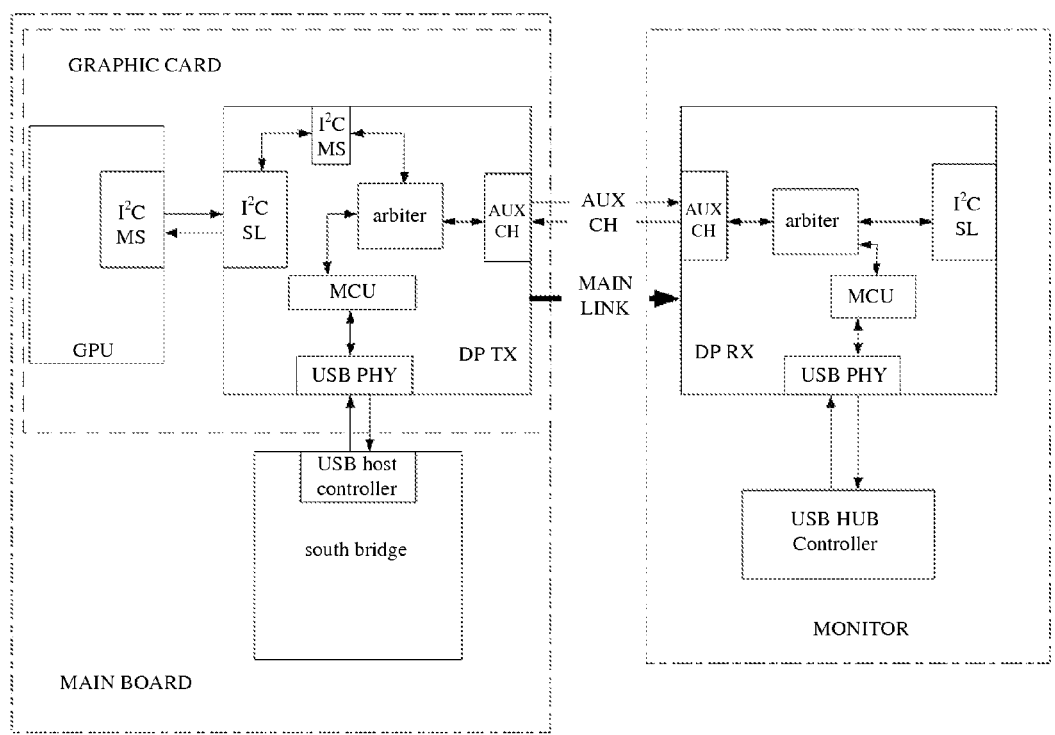
FIG._3

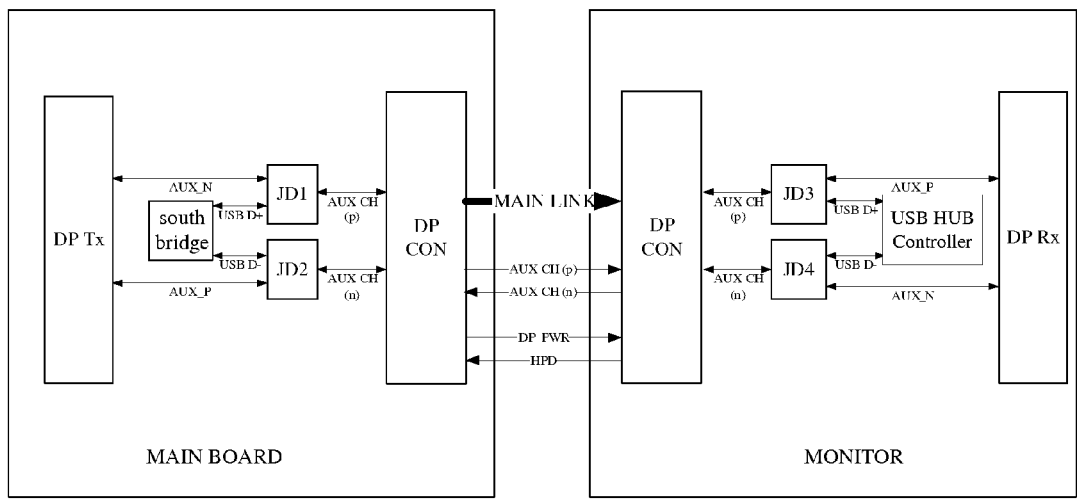
FIG._4

DATA TRANSMISSION SYSTEM WITH PROTOCOL CONVERSION

CROSS-REFERENCE TO RELATED APPLICATIONS

This application claims priority under the provisions of 35 U.S.C. §371 of International Application No. PCT/CN08/01233 filed on Jun. 26, 2008, which in turn claims priority of Chinese Patent Application No. 200710175829.5 filed on Oct. 12, 2007. The disclosures of such international application and Chinese priority application are hereby incorporated herein by reference in their respective entireties, for all purposes.

FIELD OF THE INVENTION

The invention relates to the computer field, more particularly, relates to a data transmission system using in computers.

BACKGROUND OF THE INVENTION

DisplayPort is a digital multimedia interface standard that set forth by Video Electronics Standards Association (VESA). DisplayPort supports transmitting video and sound signal on a single cable simultaneously. Meanwhile, DisplayPort may also be used to replace Low-Voltage Differential Signal (LVDS) interface.

Auxiliary Channel (AUX CH) is the auxiliary channel of DisplayPort. DisplayPort 1.1 standard defines AUX CH as a link of bidirection, low time delay, and high bandwidth. The link transmits data by using based on micro-package architecture. At present, AUX CH is mainly used to realize functions of High-Bandwidth Content Protection (HDCP) related operation, Extended Display Identification Data (EDID) access and link training and etc between the computer host and the monitor.

Universal Serial Bus (USB) is a interface standard set forth by Compaq, HP, Intel, Lucent, Microsoft, NEC and Philips together. USB is widely used in data transmission between the computer host and peripheral devices.

In the present computer system, USB devices (such as, mouse, keyboard, storage device, etc.) are needed to connect with PC host directly, or connect with monitor having USB upgoing functions. However, the conventional PC configuration for connecting USB devices to the monitor is complicated, whereas it may not be easily used by users.

SUMMARY OF THE INVENTION

In view of above one or more problems, the invention provides a data transmission system used in computers.

A computer includes a host and a monitor. USB devices communicate with the host by USB interfaces integrated on the monitor and a data transmission system which according to the invention. According to the invention, the data transmission system includes: a first conversion module provided on the host side, used for converting USB data into data in format which may be transmitted by a data transmission module, and used for converting data in format which may be transmitted by the data transmission module into USB data; a data transmission module provided between the host and the monitor, used for data intercommunication between the host and the monitor; and a second conversion module provided on the monitor side, used for converting USB data into data in format which may be transmitted by the data transmission module, and used for converting data in format which may be transmitted by the data transmission module into USB data. Wherein, the data transmission module is DisplayPort AUX CH.

Wherein, according to the invention, the data transmission system may further include: a transmission control module, used for instructing the data transmission module to preferentially transmit the data to be transmitted of DisplayPort itself in case that the data transmission module needs to transmit the data to be transmitted converted from USB data and the data to be transmitted of DisplayPort itself simultaneously. Wherein, the transmission control module may be realized by an arbiter or a relay. The first and/or second conversion units may used for conversion between USB data and $I^2C$ data as well as $I^2C$ data and the data of DisplayPort AUX CH physical layer format, and may also be used for direct conversion between USB data and data of DisplayPort AUX CH physical layer format.

With the invention, it is possible to realize the connection of the personal computer host and the monitor using only a single DisplayPort cable, thereby USB interfaces may be integrated on the monitor. This manner may reduce the complexity and cost of the computer system, and may raise user experience.

BRIEF DESCRIPTION OF THE DRAWINGS

The drawings explained here are used to provide further understandings of the invention, which constitute a part of the application. The illustrative embodiments of the invention and the description of which are used for explaining the invention, which may not consist the inappropriate limit to the invention. In the drawings:

FIG. 1 is the block diagram of the dada transmission system according to an embodiment of the invention;

FIG. 2 is detailed block diagram of internal concrete structure of the system shown in FIG. 1; and FIG. 3 is another detailed block diagram of internal concrete structure of the system shown in FIG. 1; and FIG. 4 is a further detailed block diagram of internal concrete structure of the system shown in FIG. 1.

DESCRIPTION OF THE PREFERRED EMBODIMENTS

The specific implementations of the invention will be described in detail below referring to the accompanying drawings.

Referring to FIG. 1, the dada transmission system according to an embodiment of the invention is illuminated. The dada transmission system is used in the computer, wherein, the computer including a host and a monitor. USB devices communicate with the host by USB interfaces integrated on the monitor and the data transmission system which according to the invention. As shown in FIG. 1, the data transmission system including: a first conversion module 102 provided at the host side, used for converting USB data into data in format which may be transmitted by a data transmission module and for converting data in format which may be transmitted by the data transmission module into USB data; a data transmission module 104 provided between the host and the monitor, used for data intercommunication between the host and the monitor; and a second conversion module 106 provided at the monitor side, used for converting USB data into data in format which may be transmitted by the data transmission module, and used for converting data in format which may be transmitted by the data transmission module into USB data. Wherein, the data transmission module is DisplayPort AUX CH.

Wherein, according to the invention the data transmission system may further including: a transmission control module 108, used for instructing the data transmission module to preferentially transmit the data to be transmitted of DisplayPort itself, in case that the data transmission module needs to transmit the data to be transmitted converted from USB data and the data to be transmitted of DisplayPort itself simultaneously. Wherein, the transmission control module may be realized by an arbiter or a relay. The first and/or second conversion units may be used for conversion between USB data and I$^2$C data as well as I$^2$C data and the data of DisplayPort AUX CH physical layer format, and may also be used for direct conversion between USB data and the data of DisplayPort AUX CH physical layer format.

Referring to FIG. 2, the process of converting USB data to I$^2$C data transmitted on the DisplayPort auxiliary channels according to the embodiment of the invention is illustrated. As shown in FIG. 2, on the side of the main board, USB signals (USB D+/D−) are transmitted to USB interface on the graphic card from the south bridge. The USB interface outputs parallel signals to microcontroller unit (MCU) which connected to the DisplayPort transmitting terminal chip (DP Tx). On the monitor side, the DisplayPort receiving terminal chip (DP Tx) is connected to MCU which connected with the USB HUB Controller via the USB interface. This USB HUB Controller is directly connected with USB peripheral devices on the monitor side.

Current DisplayPort may realize syntax transformation from I$^2$C to AUX CH, so as to realize the transmission of I$^2$C protocol on AUX CH. Therefore, the transmission of USB signals on AUX CH may be realized by converting USB signals into standard I$^2$C signals. In consideration of present used speed of I$^2$C being 100 Kbps, this bandwidth may satisfy low speed (1 Mbps) USB transmission. Therefore, this bandwidth is adaptable to the using for USB devices of mouse, keyboard, etc. in practice.

USB transmission is a bidirectional transmission. Following, USB data transmission from main board to monitor is taken as example to illustrate. USB data (USB D+/D−) are output to the USB interface on the graphic card from the south bridge. MCU reads USB data received by USB interface through a parallel bus (such as, 8 bits), and outputs the read parallel data to an I$^2$C Slave, integrated on DisplayPort transmitting terminal chip, through I$^2$C Master (I$^2$C MS) of MCU. The I$^2$C Master integrated on DisplayPort transmitting terminal chip transmits these data to an I$^2$C Slave on DisplayPort receiving terminal chip on the monitor side through AUX CH. The MCU on the monitor reads these data through the I$^2$C Master and transmits the data to USB interface in the form of parallel bus data. The USB interface may convert these parallel data into standard USB signals (D+/D−) and then output the data to the back-end USB HUB Controller. The USB HUB Controller is directly connected with various USB peripheral devices (such as, mouse, keyboard). In consideration that each part of the whole transmission link, including I$^2$C, AUX CH, data bus, is bidirectional, thereby the USB data transmission from the monitor to the main board is reverse of the above process.

On the main board side, there is a link of converting high speed data into low speed data. Since USB utilizing "hard handshake" as the transmission manner, namely, USB host may send token packet to negotiate with downstream USB devices before sending data. Taking the USB interrupt transmission (one of four transmission manners of USB) used by mouse and/or keyboard for example, when the downstream devices receiving token packet of requesting the downstream devices to transmit data upwards sent by the USB Host, at this time if the downstream devices cannot transmit data or have no data to transmit temporarily, then NAK may be written into the replied Handshake packet as a marker. When the USB Host receiving this message, the data transmission may be initiated again after a period of time (according to the device parameters). The whole "handshake" process is automatically finished between the USB interface and the USB Host. From the above mechanism, this link cannot cause the data lost. Since the data transmission of USB being initiated by the USB Host, above problems do not exist on the monitor side.

Referring to FIG. 3, the process of converting USB into data having DisplayPort auxiliary channel physical layer format transmitted on the DisplayPort auxiliary channel according to the embodiment of the invention is illustrated. As shown in FIG. 3, on the computer main board side, a south bridge chip is directly connected with the DisplayPort transmitting terminal chip, the DisplayPort transmitting terminal chip is controlled by I$^2$C Master (I$^2$C MS) of monitor chip (GPU). On the monitor side, the DisplayPort receiving terminal chip is directly connected with USB HUB Controller, which connected to the USB peripheral devices on the monitor side.

To better utilize the bandwidth of DisplayPort AUX CH, USB is converted to data of DisplayPort AUX CH format for transmitting. Following, the USB data transmission from the main board to the monitor is taken as an example. The USB data (USB D+/D−) are output to the DisplayPort transmitting terminal chip from the south bridge chip on the main board. When the DisplayPort transmitting terminal chip receiving these USB data, a USB physical (USB PHY) module receives these USB data and converts the data into standard USB packets and then transmit the packets to the MCU. The MCU converts these USB packets into AUX CH protocol and then transmits the protocol to an arbiter. The main function of this arbiter is to arbitrate priority between I$^2$C and USB, so as to ensure I$^2$C control signals having higher priority to be transmitted preferentially; USB packets may be transmitted when AUX CH is idle. The DisplayPort receiving terminal chip also has a similar arbiter module for ensuring I$^2$C transmission preferentially. When receiving the AUX CH data having USB data, the MCU converts the AUX CH data into standard USB packets and then transmits to the USB PHY, so as to output USB data (USB D+/D−) to the USB HUB Controller.

The I$^2$C protocol transmitted on the DisplayPort AUX CH mainly processes HDCP, Link Training, so as to enable the personal computer host to read the information of the monitor (EDID) and realize the control of the monitor. These functions have a higher priority with respect to USB. When the AUX CH is occupied by I$^2$C transmission, the MCU of the DisplayPort transmitting terminal needs to identify the token packet part in the USB data sent from the south bridge chip, and then write NAK into the replied handshake packet to indicate that the USB devices cannot receive/transmit data. According to the standards, the USB Host Controller of the south bridge chip may initiate data transmission over again every a period of time (according to device parameters). When AUX CH is idle again, MCU may normally transmit USB signals to AUX CH.

Referring to FIG. 4, the process of data transmission and data processing by using the system shown in FIG. 1 is illustrated. In FIG. 4, DP CON denotes connect of DisplayPort. In order to realize the multiplexing of the physical link of DisplayPort AUX CH, a relay (JD) is used to separate AUX (AUX_P, AUX_N) signals and USB (USB D+, USB D−)

signals. The separated USB signals are connected to the south bridge chip on the main board side and connected to USB HUB Controller on the monitor side. The USB HUB Controller is connected to the peripheral devices on the monitor side. The Separated AUX signals are connected to the DisplayPort transmitting terminal chip (DP Tx) and the DisplayPort receiving terminal chip (DP Rx), respectively. HPD, namely, Hot Plug Detect, is a hot plug signal defined by DisplayPort standard, used for sending interrupt signals to the transmitting terminals from the receiving terminals. DP_PWR is a 5V signal defined by DisplayPort standard, which is sent to the DisplayPort receiving terminals from the DisplayPort transmitting terminals.

JD shown in FIG. 4 is a pivotal member on the data transmission link, which realizes the multiplexing of the DisplayPort AUX CH physical link. The JD is a simple physical switch, typically is a member such as TX-Relay of Matsushita Electric Works. When operating, JD1 and JD2 are controlled commonly, namely, simultaneously select either the USB signals or the AUX signals, JD3 and JD4 are controlled commonly. When the system starting to work, AUX signals are acquiesced to switch on to proceed operations of link training and etc, until the system comes into steady playing stage. At this time, the Tx and Rx of DisplayPort may both acquire this message, and switch each JD to the USB signals. At this time, USB devices may normally operate.

When users need to perform the signal adjust (such as, operations of adjusting monitor resolution and etc) with the DisplayPort main link, if the operation is from the key on the monitor side, then the DisplayPort Rx on this side sends the HPD to inform the DisplayPort Tx. At this point, the DisplayPort Tx may switch JD1 and JD2 to AUX and output a low level on DP_PWR (during the DisplayPort steady playing period, the DisplayPort Tx may send+5V signals to the DisplayPort Rx through DP_PWR, the low level on the DP_PWR is defined by the negotiation of the DisplayPort Tx and Rx in the software), to inform the DisplayPort Rx to switch JD3 and JD4 to AUX also. Each JD switches back to USB signals until the system comes into steady playing period again.

If the related operations of signal adjust performed by users with the DisplayPort main link are proceeded from the host side (such as, operation from the USB keyboard), the DisplayPort Tx on the host side may switch JD1 and JD2 to AUX and output a low level on DP_PWR (during the DisplayPort steady playing period, the DisplayPort Tx may send+5V signals to the DisplayPort Rx through DP_PWR, the low level on the DP_PWR is defined by the negotiation of the DisplayPort Tx and Rx in the software), to inform the DisplayPort Rx to switch JD3 and JD4 to AUX also. Each JD switches back to the USB signals until the system comes into steady playing period again.

From above description, using DisplayPort AUX CH as the USB extended line may realize transmitting USB signals on AUX CH directly. It may enable DisplayPort AUX CH to transmit USB signal of any bandwidth without limited by AUX CH own bandwidth in theory.

In consideration that when AUX CH is occupied by I$^2$C (such as HDCP authentication and etc) for a long time (more than 1 s), the monitor is in normal black screen status, therefore at this time, the status that the USB peripheral devices cannot be operated has no effect on users. Moreover, due to that AUX CH is occupied by monitor controlling functions (such as, adjusting the brightness of the monitor and etc) for a short time, user's experience will not be affected.

Summarizing, the invention uses auxiliary channel of DisplayPort to transmit USB data, so as to realize the connection of the personal computer host and the monitor connected by using DisplayPort only one wire cable, and integrating USB interfaces on the monitor. This manner may reduce the complexity and cost of the computer system and enhance the user experience.

Above are only embodiments of the invention, and not used to limit the invention. For persons skilled in the art, the invention may have all kinds of modifications and variations. Any amendments, equal substitutions, improvements and etc should be included in the range of the claims of the invention as they are within the spirit and principle of the invention.

What is claimed is:

1. A data transmission system used in a computer, wherein the computer comprises a host and a monitor, and wherein USB devices communicate with the host by USB interfaces integrated on the monitor and the data transmission system, the data transmission system comprising:
    a first conversion module provided on the host side, the first conversion module being adapted to convert USB data into data in a format that may be transmitted by a data transmission module, and being adapted to convert data in a format that may be transmitted by the data transmission module into USB data;
    the data transmission module provided between the host and the monitor, used for data intercommunication between the host and the monitor; and
    a second conversion module provided on the monitor side, the second conversion module being adapted to convert USB data into data in a format that may be transmitted by the data transmission module, and being adapted to convert data in a format that may be transmitted by the data transmission module into USB data;
    wherein the data transmission module is DisplayPort AUX CH.

2. The data transmission system according to claim 1, wherein the data transmission system further comprises a transmission control module adapted to instruct the data transmission module to preferentially transmit DisplayPort data in the case that the data transmission module needs to transmit data converted from USB data and DisplayPort data.

3. The data transmission system according to claim 2, wherein the transmission control module comprises an arbiter.

4. The data transmission system according to claim 2, wherein the transmission control module comprises a relay.

5. The data transmission system according to claim 3, wherein at least one of the first conversion unit and the second conversion unit is adapted to perform conversion between USB data and I$^2$C data as well as between I$^2$C data and data of DisplayPort AUX CH physical layer format.

6. The data transmission system according to claim 4, wherein at least one of the first conversion unit and the second conversion unit is adapted to perform conversion between USB data and I$^2$C data as well as between I$^2$C data and data of DisplayPort AUX CH physical layer format.

7. The data transmission system according to claim 3, wherein at least one of the first conversion units and the second conversion unit is adapted to perform direct conversion between USB data and data of DisplayPort AUX CH physical layer format.

8. The data transmission system according to claim 4, wherein at least one of the first conversion unit and the second conversion unit is adapted to perform direct conversion between USB data and data of DisplayPort AUX CH physical layer format.

9. The data transmission system according to claim 1, wherein the USB data comprises non-video data.

10. The data transmission system according to claim 9, wherein the USB data comprises data received from a user input device.

11. The data transmission system according to claim 10, wherein the user input device comprises at least one of a mouse and a keyboard.

12. The data transmission system according to claim 9, wherein the USB data comprises data communicated with a USB storage device.

* * * * *